United States Patent
Gottwald

(10) Patent No.: US 8,462,428 B2
(45) Date of Patent: Jun. 11, 2013

(54) METHOD AND DEVICE FOR PROVIDING AND/OR CONTROLLING AN OPTICAL SIGNAL

(75) Inventor: Erich Gottwald, Holzkirchen (DE)

(73) Assignee: Nokia Siemens Networks OY, Espoo (FI)

( * ) Notice: Subject to any disclaimer, the term of this patent is extended or adjusted under 35 U.S.C. 154(b) by 344 days.

(21) Appl. No.: 12/812,997

(22) PCT Filed: Jan. 12, 2009

(86) PCT No.: PCT/EP2009/050242
§ 371 (c)(1),
(2), (4) Date: Aug. 11, 2010

(87) PCT Pub. No.: WO2009/090144
PCT Pub. Date: Jul. 23, 2009

(65) Prior Publication Data
US 2011/0051228 A1   Mar. 3, 2011

(30) Foreign Application Priority Data

Jan. 15, 2008  (EP) .................................... 08000698

(51) Int. Cl.
*H01S 3/00* (2006.01)
(52) U.S. Cl.
USPC ........................................ 359/337

(58) Field of Classification Search
USPC ............................ 359/337, 337.1, 337.4, 349
See application file for complete search history.

(56) References Cited

U.S. PATENT DOCUMENTS

| | | | |
|---|---|---|---|
| 5,900,968 A | 5/1999 | Srivastava et al. | |
| 5,907,420 A | 5/1999 | Chraplyvy et al. | |
| 6,785,042 B1 | 8/2004 | Onaka et al. | |
| 7,024,117 B1 | 4/2006 | Gottwald | |
| 7,362,448 B1* | 4/2008 | Liu et al. | 356/504 |
| 2006/0044646 A1* | 3/2006 | Shimizu | 359/337.4 |
| 2006/0044657 A1 | 3/2006 | Gottwald | |
| 2006/0177221 A1 | 8/2006 | Furst | |
| 2006/0263089 A1 | 11/2006 | Furst | |

FOREIGN PATENT DOCUMENTS
EP   0829981 A2   3/1998

* cited by examiner

*Primary Examiner* — Mark Hellner
(74) *Attorney, Agent, or Firm* — Laurence A. Greenberg; Werner H. Stemer; Ralph E. Locher

(57) ABSTRACT

A method provides and/or controls an optical signal, wherein a control signal and at least one data signal are optically processed into a combined signal of substantially constant optical power. The level of the at least one data signal is substantially maintained within the combined signal. In addition, an according device is provided. Suitable for compensation of Raman tilt in WDM communication systems.

14 Claims, 7 Drawing Sheets

METHOD AND DEVICE FOR PROVIDING AND/OR CONTROLLING AN OPTICAL SIGNAL

BACKGROUND OF THE INVENTION

Field of the Invention

The invention relates to a method and to a device for providing and/or controlling an optical signal.

Groups of optical signals with various wavelengths are transmitted via optical fibers utilizing in particular optical transmission amplifiers.

In a wavelength division multiplex (WDM) transmission system several data signals (channels) are combined to a channel group. In particular, these channels are amplified together.

In optical transmission systems, a particular nonlinearity is known as a Raman gain or Raman effect, which is a nonlinear scattering process and results in a power transfer from shorter wavelength channels to longer wavelength channels. The Raman gain becomes significant when a particular level of optical power distributed over a range of wavelengths is pumped into an optical fiber. In such case, the Raman gain is tilted in favor of the channels having the longer wavelengths. This undesired effect is referred to as Raman tilt. This tilt, described in dB/THz, is in a good approximation proportional to the total optical power fed into the fiber. Fast variation of total optical power results in fast variation of Raman induced tilt and constant total optical power results in constant Raman tilt, which can be simply compensated by tilted amplifiers or filters.

If a transmission is conveyed in a C-band at an overall power amounting to 100 mW per amplifier section with channel groups of 80 channels, the so-called Stimulated Raman Scattering (SRS) will result in an attenuation difference amounting of 1 dB. If the optical fiber extends to 10-20 amplifier sections, a signal difference in a wavelength range from 1528 nm to 1565 nm may amount to 10-20 dB.

In optical networks with optical add-drop-multiplexers (OADM), due to adding or dropping channels, the Stimulated Raman Scattering (SRS) has an impact on a level of the channels at the end of the optical fiber and hence at the input of a receiver or amplifier. For example, dropping "red" channels or a breach of fiber may result in the "blue" channels having a level beyond the input range of the amplifier. In addition, the transmission fiber may show an increased degree of nonlinear distortion.

BRIEF SUMMARY OF THE INVENTION

The problem to be solved is to overcome the disadvantages stated before and in particular to provide an efficient approach to compensate detrimental effects in an optical transmission system by enabling a pure optical solution without any electro-optical converter or electronic control circuitry.

This problem is solved according to the features of the independent claims. Further embodiments result from the depending claims.

In order to overcome this problem, a method for providing and/or controlling an optical signal is suggested,
- wherein a control signal and at least one data signal are optically processed into a combined signal of substantially constant optical power,
- wherein the level of the at least one data signal is substantially maintained within the combined signal.

This approach allows maintaining a constant power level of the combined signal that may be supplied, e.g., at an output of a device or optical circuit arrangement.

Advantageously, said combined signal is processed by optical means, i.e. without any electro-optical converter or electronic control circuitry.

In an embodiment, an optical power of the control signal is at least partially supplied by a light source, in particular a laser.

In another embodiment, at least one wavelength of the light source is disjoint to at least one wavelength utilized for the at least one data signal.

In particular, the data signal may comprise several channels, wherein wavelengths utilized for the data signal are in particular disjoint from the wavelength used by the light source.

In a further embodiment, the light source comprises a Raman tilt control laser.

In a next embodiment, the optical signal of the light source and the at least one data signal are fed to an optical limiter in order to obtain the combined signal.

The optical limiter processes the signals provided in particular by limiting an output power to a predefined threshold "lim". Below such threshold value the input power may substantially equal the output power of the limiter.

It is also an embodiment that the optical signal of the light source and the at least one data signal are fed to the optical limiter via a circulator or via a coupler.

Pursuant to another embodiment, the optical limiter comprises a semiconductor optical amplifier (SOA).

According to an embodiment, an output of the optical limiter is processed by an absorber and then combined with the data signal into said combined signal. Preferably, a filter may process the input signal of the absorber, wherein said filter may advantageously have a substantially inverse characteristics of the absorber.

The absorber may in particular be a saturable absorber.

According to another embodiment, the absorber comprises a semiconductor optical amplifier (SOA) or an erbium doped fiber amplifier (EDFA).

The EDFA in an absorber may in particular be used to adjust a threshold of its limiting power.

In yet another embodiment, the control signal compensates at least partially a Raman tilt and/or a Raman gain.

The problem stated above is also solved by a device for controlling an optical signal comprising
- a light source, in particular at least one laser, to at least partially provide an optical power of a control signal;
- a limiter fed by the signal from the light source and by a data signal providing an combined signal of substantially constant optical power.

According to an embodiment, the data signal is coupled with the output of the limiter to provide said combined signal.

According to a next embodiment, the data signal is coupled via an attenuator, in particular via an adjustable attenuator, with the output of the limiter to provide said combined signal.

Pursuant to yet an embodiment, the output of the limiter is fed to an absorber, wherein the output of said absorber provides (an optical power of) a control signal portion of the combined signal.

As a next embodiment, a filter is provided before the absorber, wherein said filter in particular shows a substantially inverse characteristics of the absorber.

It is also an embodiment that a circulator is provided to combine the data signal and the signal from the light source.

As an alternative embodiment, a coupler may be provided to combine the data signal and the signal from the light source.

Pursuant to an embodiment, the device may be used in or part of an optical transmission system, said system comprising at least one semiconductor optical amplifier (SOA) for suppressing and/or reducing noise and/or interference by cross gain modulation.

Furthermore, such device may comprise at least one switch that is based on or realized by at least one semiconductor optical amplifier (SOA).

Embodiments of the invention are shown and illustrated in the following figures:

DESCRIPTION OF THE INVENTION

A semiconductor optical amplifier (SOA) is described in [1]. Such SOA may be utilized as a saturable absorber or as a limiter. Furthermore, an erbium doped fiber amplifier (EDFA) can be used in addition or instead.

The approach provided herein suggests an optical solution for a fast control of an optical signal without additional electro-optical converters or additional electronic control circuits.

A transparency T of an ideal optical limiter with a limiting power "lim" can be denoted as follows:

$$T = \frac{P_{out}}{P_{in}}$$

with $T = 1$ for $P_{in} < \text{lim}$ and $T = \frac{\text{lim}}{P_{in}}$ for $P_{in} \geq \text{lim}$, wherein P refers to a power of the optical signal.

$$P_{out} = P_{in} \cdot T$$

results to $$P_{out} = P_{in} \cdot \frac{\text{lim}}{P_{in}} = \text{lim for } P_{in} \geq \text{lim} \quad (1.1)$$

and $$P_{out} = P_{in} \text{ otherwise.} \quad (1.2)$$

In addition, a saturable absorber can be denoted as $$P_{out} = 0 \text{ for } P_{in} < \text{lim}_{abs} \text{ and} \quad (2.1)$$

$$P_{out} = P_{in} - \text{lim}_{abs} \text{ for } P_{in} > \text{lim}_{abs}. \quad (2.2)$$

Advantageously, the limiter and/or the absorber are used in order to provide an arrangement with a constant optical output power even if single data signals are dropped:

$$P_{data} + P_{control} = \text{const.}, \quad (3)$$

with $P_{data}$ being a power of a data signal comprising several single data signals $P_{\lambda_k}$ with $k=1, \ldots, n$, n being a number of channels of the optical band to be controlled, and $P_{control}$ being a power of a control signal.

In addition, if at least one data signal is dropped, the remaining data signals sustain their respective power level.

The requirement set forth by equation (3) can be met by providing at least two signal paths:
(a) A control path for adjusting the control signal and
(b) a data path to which the adjusted control signal is added.

The wavelength utilized by a control laser supplying the optical power to the control path is disjoint to the wavelengths of the data signals (channels).

The saturable absorber subtracts a constant amount of light power from the signal and may hence be utilized to remove a constant offset from the signal. This is in particular useful to remove an offset of a control laser that is set to full level.

Embodiments without such saturable absorber will be referred to in more detail below.

Figure 1:
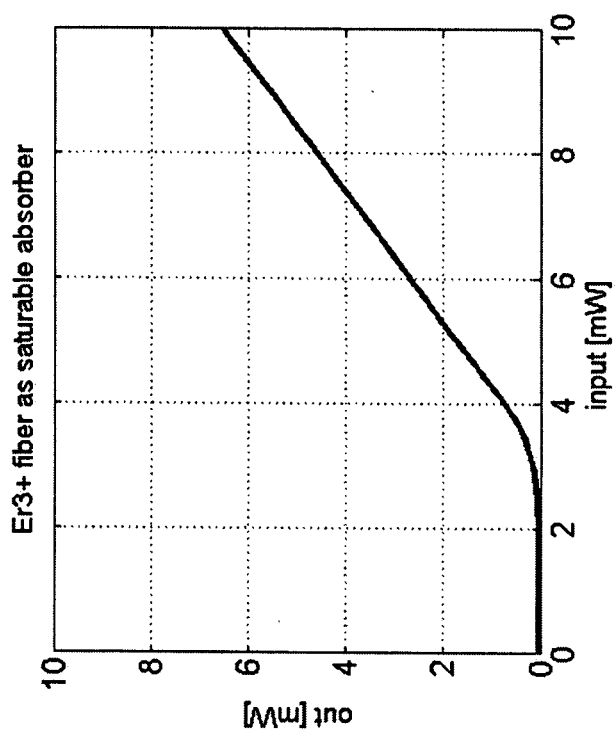
FIG. 1 shows a transfer characteristics of an erbium 3+ doped glass fiber.

An absorber may in particular be realized by an erbium doped ($Er^{3+}$) glass fiber allowing for a time delay in a range of 100 s of milliseconds. A transfer characteristics of a typically doped glass fiber used as saturable absorber is shown in FIG. 1.

It is to be noted that such an erbium doped glass fiber may require a filter put in front of the absorber comprising an inverse characteristics of the saturable absorber.

The approach presented advantageously exploits the fact that the transmission characteristics of the optical limiter depends on the input power of the optical signal as follows:

$$P_{out_2} = P_{in_1} \cdot \frac{\text{lim}}{P_{in_1} + P_{in_2}} \text{ and} \quad (4.1)$$

$$P_{out_1} = P_{in_2} \cdot \frac{\text{lim}}{P_{in_1} + P_{in_2}} \quad (4.2)$$

Figure 2:
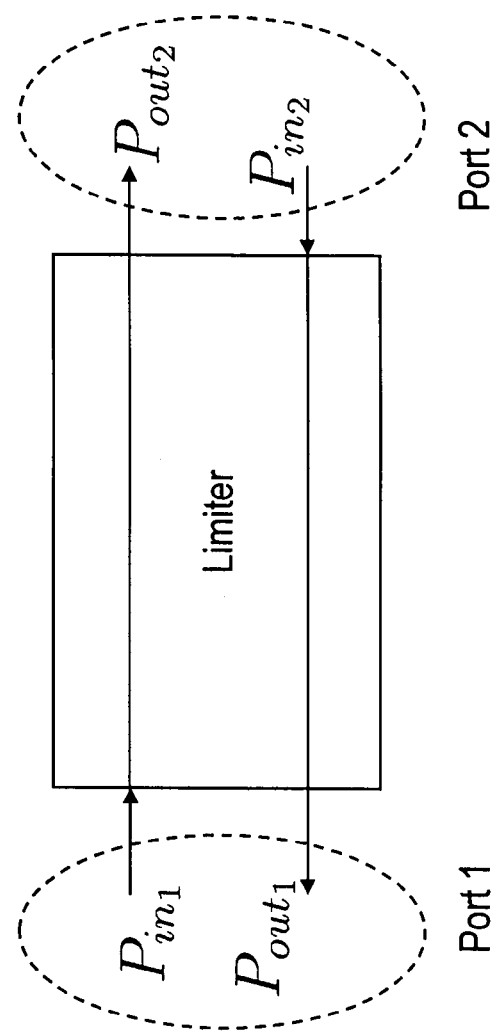
FIG. 2 shows a quadripole of a limiter comprising two ports.

FIG. 2 shows the corresponding quadripole of the limiter. However, the indices in equations (4.1) and (4.2) may refer to different directions of a signal or to different wavelengths.

It may in particular be extraneous whether the optical signals towards or from the limiter are co-directional or contra-directional. The limiter may be realized in order to work properly independent from particular wavelengths applied.

Equations (4.1) and (4.2) correspond to a term $$\frac{1}{1+x}$$

that can be expanded into a series as follows:

$$\frac{1}{1+x} = 1 - x + x^2 - x^3 + x^4 \ldots$$

For x<0.3 an error for discontinuing the series after the linear term is below 10%.

Figure 3:
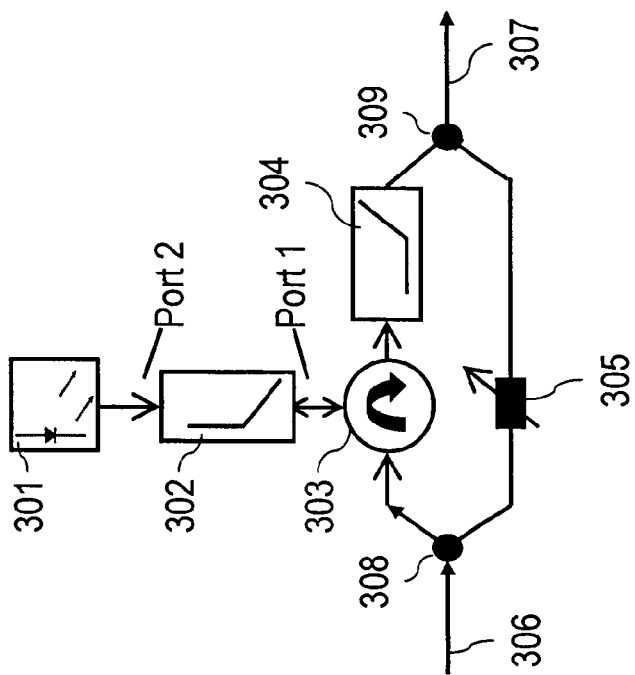
FIG. 3 shows a block diagram of a power control device that allows adjustment of an optical power to provide a substantially constant optical power at its output.

FIG. 3 shows an block diagram of a device that allows for an adjustment of an optical power to provide a substantially constant optical power at its output.

A Raman tilt control laser (RTCL) 301 is attached to a Port 2 of an optical limiter 302, which has a port Port 1 connected to a circulator 303. An optical signal 306 is connected via a coupler 308 to the circulator 303 and to a static attenuator 305. The circulator 303 is further connected to a saturable absorber 304. The signal output of said saturable absorber 304 and the signal output by the static attenuator 305 are combined by a coupler 309 into an output signal 307.

According to the circulator 303, the optical signal 306 cannot directly reach the saturable absorber 304. The optical signal 306 is directed via said circulator 303 to the Port 1 of the optical limiter 302 in order to control the control signal provided by the Raman tilt control laser 301 which is then fed back to the circulator 303 and hence to the saturable absorber 304.

As an alternative for the circulator 303, a 2×2-coupler may be used.

As an example, an optical signal $P_{control_2}$ provided by the Raman tilt control laser 301 and input to the Port 2 of the optical limiter 302 may amount to $P_{control_2} > 1.5 \cdot \max(P_{306})$ via a 50:50 coupler;

$lim_{abs} = \max(P_{306})$ and $lim > 2 \cdot \max(P_{306})$ with $P_{306}$ being the power of the optical input signal 306. The above exemplary values may result in an substantially constant output signal 307 with an error amounting to less than 10%. Hence, a Raman tilt determined in dB/THz can be reduced by a factor of more than 10.

The arrangement described herein may be deployed directly after a photonic cross-connect either at the origin of an optical section or before a first optical amplifier (booster) a the origin of the optical section.

Advantageously, the approach provided herein allows a utilization of optical limiters for a nominal/actual value comparison and hence to optically control the optical power of an optical light source accordingly.

Figure 4:
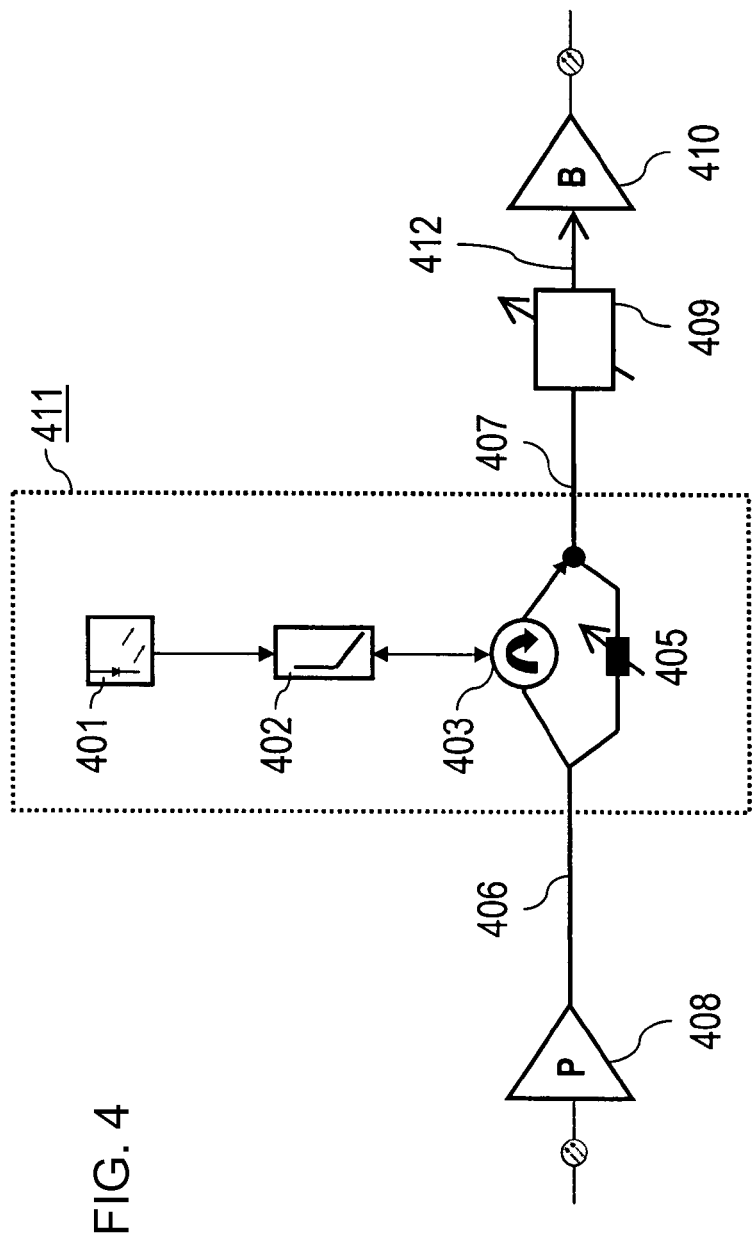
FIG. 4 shows a block diagram of an optical power control device deployed within a two-stage optical amplifier.

The arrangement according to FIG. 3 may be deployed within a two-stage optical amplifier as depicted in FIG. 4.

FIG. 4 shows an arrangement 411 that is similar to FIG. 3, but without the saturable absorber.

Hence, a Raman tilt control laser 401 provides optical power to a fast optical limiter 402 which is further connected to a circulator 403. The circulator 403 conveys an input signal 406 to the limiter 402 and an signal from the limiter 402 towards an output 407. The input signal 406 is also fed to the output 407 via an attenuator 405.

An amplifier 408 with constant gain provides the optical signal 406 and the output signal 408 is conveyed to adjustable slow optical components (ASOC) 409. A signal 412 of constant power is fed to a booster 410. In particular, a gain flattening filter may be provided as a part of the ASOC 409.

Figure 5:
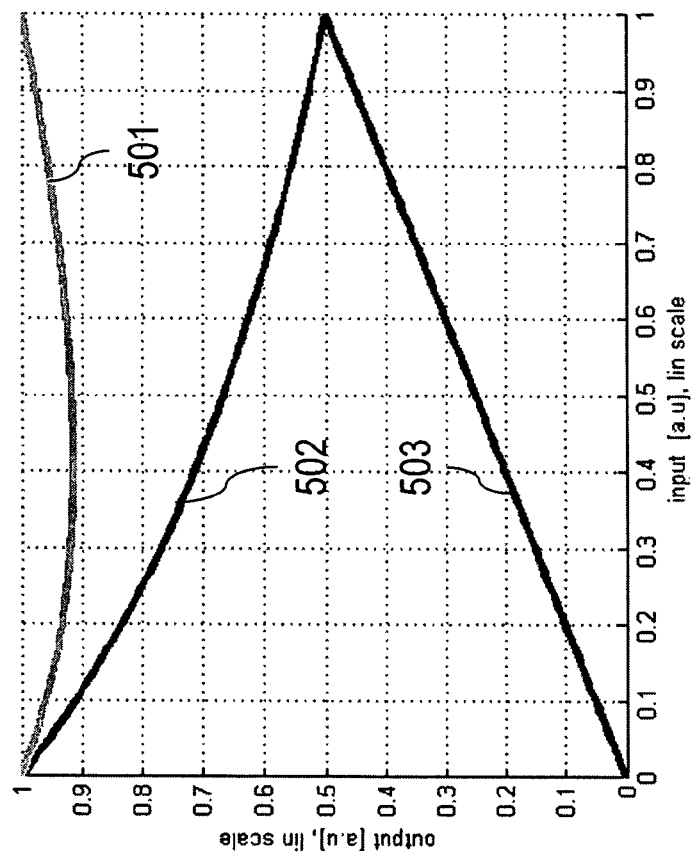
FIG. 5 shows a graph of the power of the Raman tilt control laser as a function of an input signal power in view of an output signal.

FIG. 5 shows a graph 502 of the power of the Raman tilt control laser 401 as a function of an input signal power 503 in view of the output signal 501 (see signal 407 in FIG. 4).

According to FIG. 5, the input signal power can be distributed at a ratio of 2:1, i.e. ⅔ of the total power is used for control power and ⅓ of the total power is used for data signals. The input signal 503 varies from a minimum value of (no signal at all) to a maximum value of 1.0.

Figure 6:
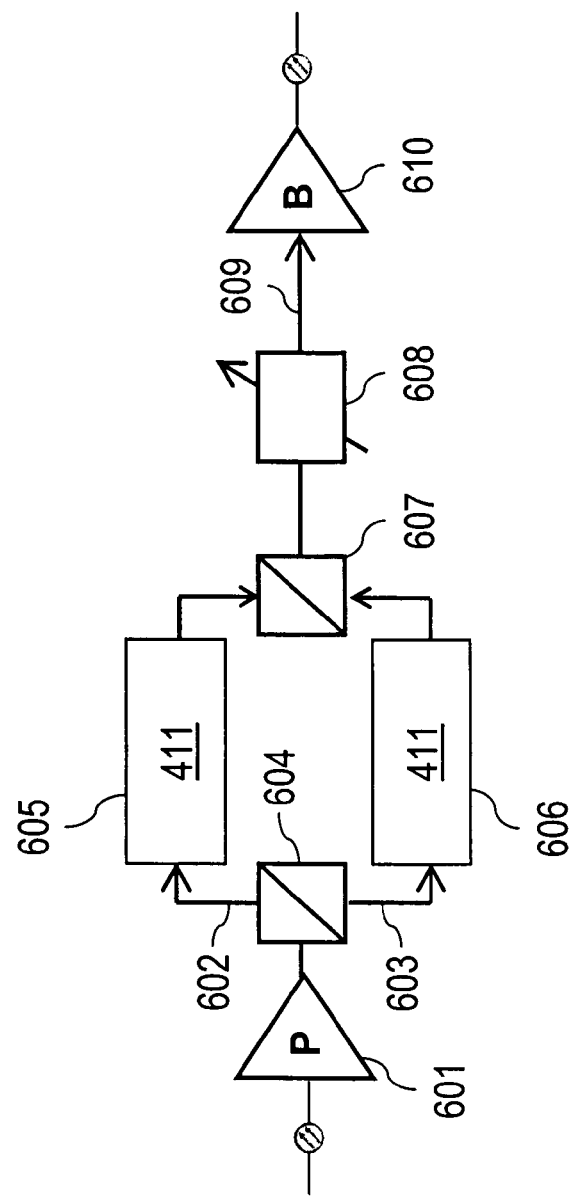
FIG. 6 shows a block diagram of an optical power control device for two different subbands.

In an example shown in FIG. 6, an output signal of an amplifier 601 is fed to a band splitter 604 that separates a red portion 602 and a blue portion 603 from the optical signal. Each portion 602 and 603 is fed to a separate arrangement 605 and 606 which correspond to the arrangement 411 of FIG. 4. The output of each arrangement 605 and 606 is fed to a band-combiner 607 and further conveyed to an adjustable slow optical component ASOC 608. The output signal of the ASOC 608 is of constant power and is conveyed to a booster 610.

Two Raman tilt control lasers are used, each for a subband of the optical transmission band. This allows to sustain not only the Raman tilt but also the Raman gain at a constant level. Furthermore, this approach may be adopted to more than two subbands. The embodiment of FIG. 6 copes without a saturable absorber. As an option, saturable absorbers may be added according to the embodiment shown in FIG. 3.

It is in particular possible to provide a more complex arrangement comprising more parallel control paths and hence to obtain the same precision but without providing any saturable absorber.

Figures 7A, 7B:
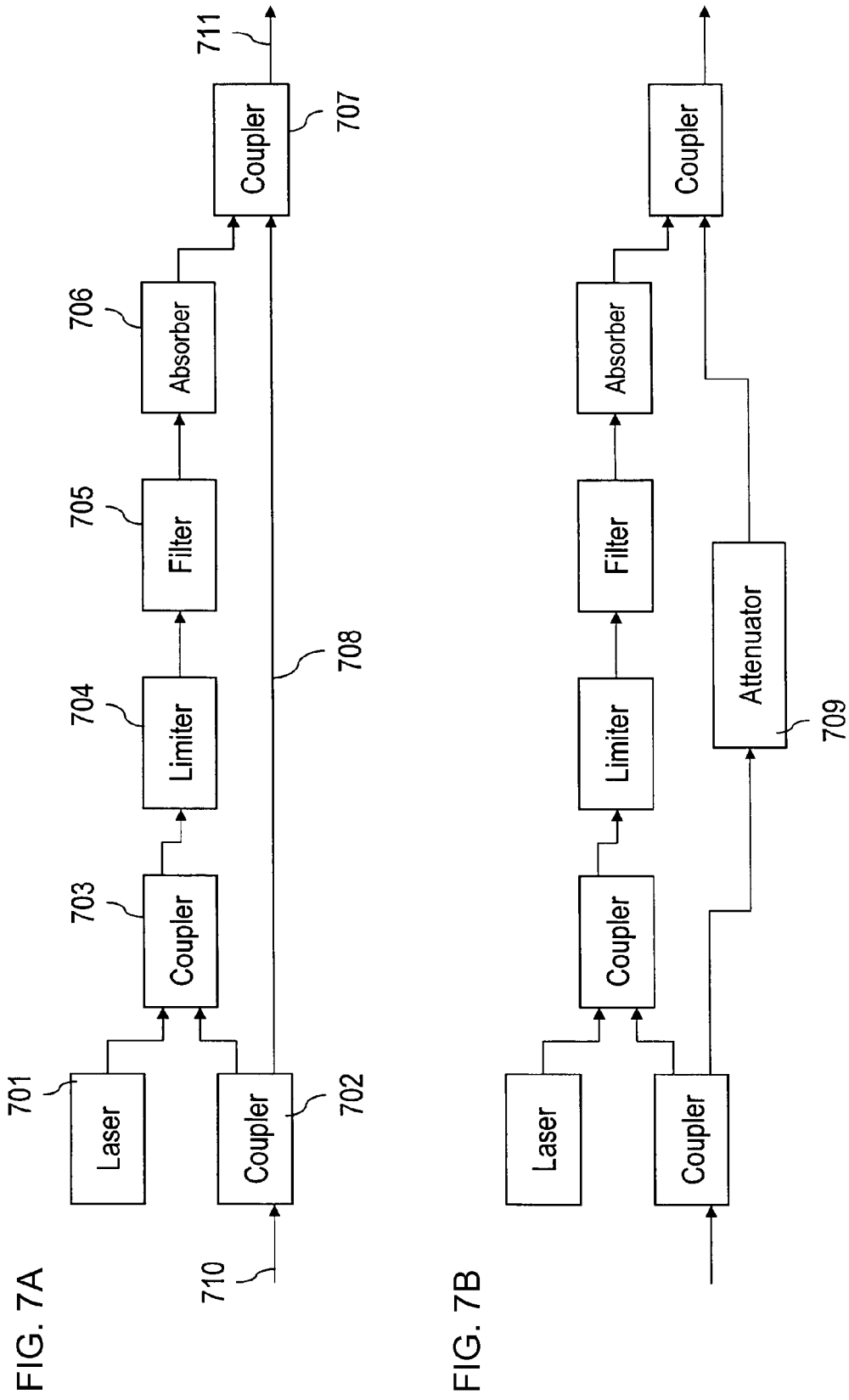
FIG. 7A shows an optical total power control unit with a first path comprising an optical data signal and a control information and a second path comprising the optical data signal only, wherein a laser pumps external optical power to the first path to provide a control signal.
FIG. 7B shows the optical total power control unit of FIG. 7A with an attenuator arranged in the second path.

FIG. 7A shows a different arrangement that in particular utilizes couplers instead of the circulator shown and explained, e.g., in FIG. 3 above.

In FIG. 7A, a control and signal path is depicted comprising a laser 701, a coupler 702, a coupler 703, a limiter 704, a filter 705, an absorber 706 and a coupler 707. In addition, a signal only path 708 is depicted between the coupler 702 and the coupler 707.

A signal 710 is input to the coupler 702 and conveyed via said signal path 708 to the coupler 707 that produces an output signal 711.

In addition, the signal 710 is also branched off via said coupler 702 to the coupler 703 to which the laser 701 provides a portion of the optical power of the control signal. The coupler 703 conveys the combined signals to the limiter 704. After said limiter 704 the signal is filtered by the filter 705 to reduce the portion of the original signal 710. The absorber 706 removes the control offset and provides only the control signal to the coupler 707.

FIG. 7B is similar to the embodiment of FIG. 7A. The only difference is that the signal path 708 comprises an attenuator 709 to provide a fine adjustment in order to meet or compensate tolerances of the optimizing limiter 704 and absorber 706.

The output signal 711 comprises a signal portion and a control portion, wherein the power of the output signal 711 is maintained at a constant level.

REFERENCE(S)

[1] ROPP C, GOLDHAR J: "Nonlinear Mach-Zehnder Interferometer as a DPSK Signal Regenerator", http://www.ece.umd.edu/merit/archives/merit2006/merit_fair06_papers/Paper_11_Ropp.pdf

The invention claimed is:

1. A method for providing and controlling an optical signal, which comprises the steps of:
    splitting an optical input signal into a first portion and a second portion;
    providing an optical control signal;
    feeding the optical control signal and the first portion of the optical input signal to an optical limiter, whereat the first portion of the optical input signal determining a power of an output control signal portion; and
    combining the output control signal portion and the second portion of the optical input signal for forming a combined signal of substantially constant optical power, and a level of the optical input signal being substantially maintained within the combined signal.

2. The method according to claim 1, wherein the optical control signal is generated by a Raman tilt control laser.

3. The method according to claim 1, which further comprises feeding the first portion of the optical input signal to the optical limiter via one of a circulator and a coupler.

4. The method according to claim 1, wherein the optical limiter has a semiconductor optical amplifier (SOA).

5. The method according to claim 1, wherein the output control signal portion of the optical limiter is fed to an absorber and then combined with the second portion of the optical input signal into the combined signal.

6. The method according to claim 1, wherein the second portion of the optical input signal is transmitted via an adjustable attenuator.

7. The method according to claim 5, wherein a filter processes an input signal of the absorber.

8. The method according to claim 7, wherein the filter has substantially inverse characteristics of the absorber.

9. The method according to claim 7, wherein the absorber is a saturable absorber.

10. The method according to claim 9, wherein the absorber contains one of a semiconductor optical amplifier (SOA) or an erbium doped fiber amplifier (EDFA).

11. The method according to claim 1, wherein the optical control signal compensates at least partially at least one of a Raman tilt or a Raman gain.

12. A device for at least one of providing or controlling an optical signal, the device comprising:
    a splitter splitting an optical input signal into a first portion and a second portion;
    a light source for providing an optical control signal;
    a limiter receiving the optical control signal from said light source and the first portion of the optical input signal, whereat the first portion of the optical input signal determining a power of an output control signal portion; and
    a combiner combining the output control signal portion output and the second portion of the optical input signal providing a combined signal of substantially constant optical power.

13. The device according to claim 12, further comprising:
    an absorber disposed in a first signal path of the output control signal portion output by the limiter; and
    an attenuator disposed in a second signal path of the second portion of the optical input signal.

14. The device according to claim 12, wherein said light source is a Raman tilt laser.

* * * * *